(12) United States Patent
Peters et al.

(10) Patent No.: US 9,284,922 B2
(45) Date of Patent: Mar. 15, 2016

(54) CONTROLLING THE CLOSING FORCE OF A CANISTER PURGE VALVE PRIOR TO EXECUTING LEAK DIAGNOSTIC

(71) Applicant: Ford Global Technologies, LLC, Dearborn, MI (US)

(72) Inventors: Mark W. Peters, Wolverine Lake, MI (US); Matthew Werner, Marysville, MI (US); Scott A. Bohr, Plymouth, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 455 days.

(21) Appl. No.: 13/753,393

(22) Filed: Jan. 29, 2013

(65) Prior Publication Data
US 2014/0209069 A1  Jul. 31, 2014

(51) Int. Cl.
*F02M 25/08* (2006.01)
(52) U.S. Cl.
CPC ............. *F02M 25/0809* (2013.01); *Y02T 10/40* (2013.01)
(58) Field of Classification Search
CPC .......... F02M 25/0809; F02M 25/0836; F02M 25/0818; Y02T 10/40; F02D 41/004; F02D 41/2451
USPC ........... 123/516, 518–520; 73/114.39, 114.43
See application file for complete search history.

(56) References Cited

U.S. PATENT DOCUMENTS

| | | | |
|---|---|---|---|
| 5,333,590 A | 8/1994 | Thomson | |
| 5,390,645 A | 2/1995 | Cook et al. | |
| 5,413,082 A | 5/1995 | Cook et al. | |
| 5,649,687 A | 7/1997 | Rosas et al. | |
| 5,878,725 A | 3/1999 | Osterbrink | |
| 6,050,245 A | 4/2000 | Cook et al. | |
| 6,205,982 B1 | 3/2001 | Blomquist et al. | |
| 6,367,458 B1 | 4/2002 | Furusho et al. | |
| 6,505,599 B1 * | 1/2003 | Mashiki et al. | 123/295 |
| 6,578,564 B2 * | 6/2003 | Bagnasco | 123/698 |
| 6,622,691 B2 * | 9/2003 | Bagnasco et al. | 123/295 |
| 6,675,788 B2 * | 1/2004 | Inoue et al. | 123/698 |
| 6,868,808 B2 * | 3/2005 | Holder et al. | 123/3 |
| 7,290,535 B2 | 11/2007 | Kimura | |
| 7,469,685 B2 * | 12/2008 | Osanai | 123/520 |
| 2003/0047161 A1 * | 3/2003 | Bagnasco et al. | 123/295 |
| 2003/0051715 A1 * | 3/2003 | Bagnasco | 123/698 |
| 2005/0072221 A1 * | 4/2005 | Itakura et al. | 73/118.1 |
| 2007/0277789 A1 * | 12/2007 | Ishikawa et al. | 123/520 |
| 2008/0092858 A1 * | 4/2008 | Satoh et al. | 123/520 |
| 2008/0271718 A1 * | 11/2008 | Schondorf et al. | 123/520 |
| 2008/0308072 A1 * | 12/2008 | Banerjee et al. | 123/518 |
| 2009/0000603 A1 * | 1/2009 | Takakura et al. | 123/520 |

(Continued)

FOREIGN PATENT DOCUMENTS

JP   2002004959 A * 1/2002   ............. F02M 25/08

*Primary Examiner* — Thomas Moulis
*Assistant Examiner* — Joseph Dallo
(74) *Attorney, Agent, or Firm* — James Dottavio; Alleman Hall McCoy Russell & Tuttle LLP (57) ABSTRACT

A method for a vehicle having a fuel vapor canister coupled between a fuel tank and an engine intake manifold via an electronically controlled purge valve, comprises initiating a vapor leak test under predetermined conditions and in response to the initiation, fully opening the purge valve from a closed position to a fully open position for a predetermined time, and then fully closing the purge valve after the predetermined time and commencing the leak test.

16 Claims, 5 Drawing Sheets

(56) References Cited

U.S. PATENT DOCUMENTS

| | | | |
|---|---|---|---|
| 2009/0070001 A1* | 3/2009 | Takakura et al. | 701/102 |
| 2009/0084363 A1* | 4/2009 | Reddy | 123/520 |
| 2009/0266147 A1* | 10/2009 | Maegawa | 73/40.7 |
| 2009/0308359 A1* | 12/2009 | Wang | F02M 25/089 123/520 |
| 2010/0252005 A1* | 10/2010 | Kitamoto et al. | 123/518 |
| 2011/0079201 A1* | 4/2011 | Peters et al. | 123/520 |
| 2011/0132331 A1* | 6/2011 | Pursifull | 123/478 |

* cited by examiner

CONTROLLING THE CLOSING FORCE OF A CANISTER PURGE VALVE PRIOR TO EXECUTING LEAK DIAGNOSTIC

FIELD

The present description relates to systems and methods for operation and diagnostics of on-board fuel vapor recovery systems.

BACKGROUND AND SUMMARY

Fuel vapor recovery systems are known that have carbon fuel vapor canisters coupled to a fuel tank for absorbing fuel vapors. The canister also is coupled to an engine intake manifold through an electronically controlled purge valve. Under purge conditions, and when the intake manifold is below atmospheric pressure, the purge valve, and a vent valve which is connected to the canister, are opened to induct fuel vapors from the canister.

Government agencies have mandated periodic on-board vapor leak testing of the fuel vapor recovery system. After a purge, the purge valve and vent valves may be closed so the canister is below atmospheric pressure. During a subsequent vapor leak test, a significant change in canister pressure may indicate a vapor leak.

The inventors herein have recognized that the manifold vacuum assists full closure and seating of the purge valve. A return spring closes the purge valve and an electrically actuated solenoid opens the valve against the spring. The manifold vacuum therefore helps in closing the valve. The inventors have recognized that when the manifold vacuum is not available, such as when the engine is off in a hybrid vehicle or in the stop condition of a vehicle equipped with stop/start, the purge valve may not always be fully seated in the closed position and subsequent vapor leak tests may then provide a false negative. Furthermore, the canister purge valve may be a variable pulse width modulated device, and the valve seating force may vary depending on the duty cycle of the valve prior to completion of the leak test. A variable canister purge valve seating force may cause fuel system leak detection to be unreliable.

In one example of operation, the inventors herein have overcome these and other issues, by closing the purge valve for a first predetermined time, then fully opening the purge valve for a second predetermined time, then fully closing the purge valve and commencing the leak test. The valve opening for the second predetermined time may be brief and cause the valve bounce off the open stop position thereby adding more momentum to the final closing force to provide a good valve seat.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
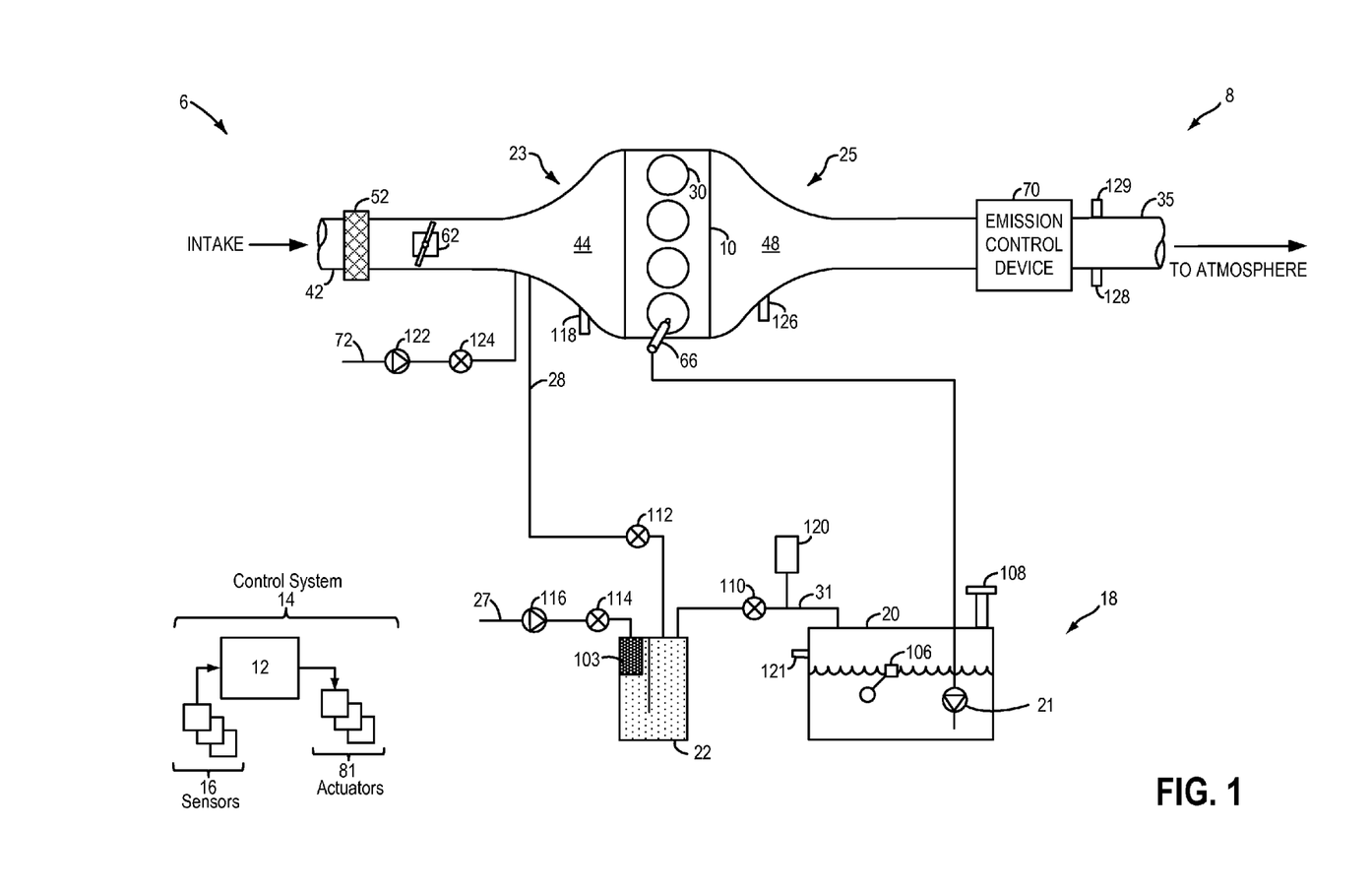
FIG. 1 shows a schematic depiction of an engine and an associated fuel system.

Methods and systems are provided for generating and maintaining at least some negative pressure in a fuel system coupled to a hybrid vehicle, such as the fuel system of FIG. 1. A controller may be configured to perform a control routine, such as the example routines of FIGS. 3 and 5, to coordinate the opening and closing of a canister purge valve when a fuel vapor recovery system leak test is performed. The controller may perform the leak testing when the engine is off or on, for example, according to the routines in FIGS. 3 and 5. An example timeline for operation of a fuel vapor recovery system leak test is described at FIG. 4. In this way, poor seating of the canister purge valve during leak testing can be reduced, thereby improving the reliability in leak detection.

FIG. 1 shows a schematic depiction of a hybrid vehicle system 6 that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

In some embodiments, engine 10 may be a boosted engine wherein the engine intake includes a boosting device, such as a turbocharger. When included, a turbocharger compressor may be configured to draw in intake air at atmospheric air pressure and boost it to a higher pressure. The turbocharger compressor may be driven by the rotation of an exhaust turbine, coupled to the compressor by a shaft, the turbine spun by the flow of exhaust gases there-through.

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated (e.g., canister load is higher than a threshold), hydrocarbons stored in fuel vapor canister 22 may be purged to engine intake 23 by opening canister purge valve 112 and canister vent valve 114. Canister purge valve 112 and canister vent valve 114 may be solenoid valves, or variable pulse width modulated solenoid valves that are controlled by the control system 14. While a single canister 22 is shown, it will be appreciated that fuel system 18 may include any number of canisters.

Canister 22 may include a buffer 103 (or buffer region), each of the canister and the buffer comprising the adsorbent. As shown, the volume of buffer 103 may be smaller than (e.g., a fraction of) the volume of canister 22. The adsorbent in the buffer 103 may be same as, or different from, the adsorbent in the canister (e.g., both may include charcoal). Buffer 103 may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing any fuel vapor spikes from going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and canister purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve 114 may also be used for diagnostic routines. The canister vent valve 114 may be opened during fuel vapor storing operations (for example, during fuel tank refueling and while the engine is not running) so that air, stripped of fuel vapor after having passed through the canister 22, can be pushed out to the atmosphere. Likewise, during purging operations (for example, during canister regeneration and while the engine is running), the canister vent valve 114 may be opened to allow a flow of fresh air to strip the fuel vapors stored in the canister 22.

During canister purging operation, the timing of closing the CVV 114 and the CPV 112 may be adjusted towards the end of the purging operation to hold at least some vacuum in the tank. Specifically, the CVV 114 may be closed before the CPV 112 is closed so that fuel system vacuum is maintained in between purge operations. This allows a subsequent canister purge operation to be initiated with the fuel tank 20 under negative pressure, enabling flow through the canister bed to be the path of least resistance. This may not only achieve increased purging of the canister bed but may also reduce drawing of fuel tank vapors from the fuel tank vapor dome directly into the engine intake, while bypassing the canister bed.

As such, hybrid vehicle system 6 may have reduced engine operation times due to the vehicle being powered by engine system 8 during some conditions, and by the energy storage device (e.g., a battery) under other conditions. While the reduced engine operation times reduce overall carbon emissions from the vehicle, they may also lead to insufficient or incomplete purging of fuel vapors from the vehicle's emission control system. In some embodiments, to address this issue, vapor blocking valve 110 (or VBV) may be optionally included in conduit 31 between fuel tank 20 and canister 22. In some embodiments, vapor blocking valve 110 may be a solenoid valve wherein operation of the valve is regulated by adjusting a driving signal (or pulse width) of the dedicated solenoid.

During vehicle storage when the engine is off, VBV 110 may be kept closed to limit the amount of diurnal vapors directed to canister 22 from fuel tank 20. During refueling operations, and selected purging conditions, VBV may be opened to direct fuel vapors from the fuel tank 20 to canister 22. By opening the valve during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 110 positioned along conduit 31, in alternate embodiments, the isolation valve may be mounted on fuel tank 20. While the vapor blocking valve is said to open to relieve fuel tank over-pressure (e.g., opened when fuel tank pressure is higher than a threshold pressure and below atmospheric pressure), in still other embodiments, fuel tank 20 may also be constructed of material that is able to structurally withstand high fuel tank pressures, such as fuel tank pressures that are higher than the threshold pressure and below atmospheric pressure.

One or more pressure sensors 120 may be coupled to fuel tank 20 for estimating a fuel tank pressure or vacuum level. While the depicted example shows pressure sensor 120 coupled between the fuel tank and VBV 110 along conduit 31, in alternate embodiments, the pressure sensor may be coupled to fuel tank 20. In still other embodiments, a first pressure sensor may be positioned upstream of the vapor blocking valve, while a second pressure sensor is positioned downstream of the vapor blocking valve, to provide an estimate of a pressure difference across the valve.

Vent 27 may further include a vacuum pump 116. Vacuum pump 116 may be used for lowering the pressure in the canister 22, for example, during evaporation leak detection testing. Vacuum pump 116 may further be used for lowering the pressure in fuel tank 20 and conduit 31 when a vapor blocking valve 110 and refueling door 108 are open and closed, respectively. As an alternative, vacuum pump 116 may also be coupled to the fuel tank 20 or conduit 31 for lowering the pressure of the fuel system. When vacuum pump 116 is coupled to the fuel tank 20 or conduit 31, vacuum may be applied to fuel system via vacuum pump 116 without opening CVV 114.

An additional vent line 72 may be included at engine intake manifold 44. Vent line 72 may comprise a vent line valve 124 and vacuum pump 122. Vent line valve 124 may be opened and vacuum pump 122 may be turned on in order to lower the pressure in engine intake manifold 44. For example, if the canister purging is started when the intake manifold vacuum is low (e.g., due to turbocharging), then vacuum pump 122 may be used to draw a vacuum in engine intake manifold 44 so that fuel vapors can be drawn from canister 22 to engine intake manifold. As another example, the vacuum pump 122 may be used to lower the pressure in the engine intake manifold 44 when performing evaporation leak detection testing when the engine is on.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake.

An optional canister check valve (not shown) may be included in purge line 28 to prevent intake manifold pressure from flowing gases in the opposite direction of the purge flow. As such, the check valve may be used if the canister purge valve control is not accurately timed or the canister purge valve itself can be forced open by a high intake manifold pressure. An estimate of the manifold absolute pressure (MAP) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel recovery system 7 and fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open vapor blocking valve (VBV) 110 and canister vent valve (CVV) 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open vapor blocking valve 110 and canister vent valve 114, while maintaining canister purge valve 112 closed, to depressurize the fuel tank before allowing enabling fuel to be added therein. As such, vapor blocking valve 110 may be kept open during the refueling operation to allow refueling vapors to be stored in the canister. After refueling is completed, the vapor blocking valve and the canister vent valve may be closed.

As yet another example, the fuel system may be operated in a canister purging mode (e.g., after an emission control device light-off temperature has been attained and with the engine running), wherein the controller 12 may open canister purge valve 112 and canister vent valve 114 sequentially, with the canister purge valve opened before the canister vent valve is opened. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister (herein also referred to as the canister load) is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Controller 12 may also be configured to intermittently perform leak detection routines on fuel system 18 (e.g., fuel vapor recovery system) to confirm that the fuel system is not degraded. As such, leak detection routines (shown in FIGS. 3 and 5) may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then seal the fuel system while monitoring a change in fuel tank pressure (e.g., a rate of change in the vacuum level, or a final pressure value).

In one example, to perform the leak test, negative pressure generated at engine intake 23 is applied on the fuel system until a threshold level is reached. Alternately, if the intake engine manifold vacuum is low (e.g., due to turbocharging, or low engine speeds), vent line valve 124 may be opened and vacuum pump 122 may be used to apply vacuum to the fuel system. Then, the fuel system is isolated from the engine intake and a rate of vacuum bleed-up is monitored. Based on the rate of change in fuel system vacuum, a fuel system leak can be identified. In another example, where at least some negative pressure is held in the fuel system (such as at the fuel tank) before purging is stopped (via timed closing of the canister vent valve), the fuel system vacuum may be advantageously used during non-purging conditions to identify a fuel system leak. Specifically, the fuel tank vacuum/pressure may be monitored during the non-purging conditions and a leak may be determined based on the rate at which the fuel tank pressure bleeds up from the vacuum conditions to barometric pressure. At the start of the leak testing, the variable pulse width modulated solenoid canister purge valve 112 may be cycled full open, full close, full open, and then full closed by controller 12 to fully seat the canister purge valve 112. In this manner leaks in the fuel vapor recovery system through the canister purge valve during leak testing can be reduced. In one example, a fuel system leak may be determined based on the rate of change in fuel tank pressure being larger than a threshold rate. Herein, by using the existing fuel tank vacuum to assess for leaks during non-purging conditions, the use of an auxiliary or dedicated vacuum source for performing leak detection routines is decreased. In addition, by performing the leak detection using the existing fuel system vacuum during non-purging conditions, completion of the leak detection routine in the limited engine running time available on hybrid vehicles may be more consistently achieved.

When included, vapor blocking valve 110 may be maintained closed during the leak detection routine to allow the negative pressure of the fuel system to be monitored. However, in embodiments where an alternate source of negative pressure is used to perform the leak detection, the vapor blocking valve may be opened to allow the corresponding negative or positive pressure to be applied on the fuel tank.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, fuel system pressure sensor 121, and pressure sensor 129. Other sensors such as additional pressure, temperature, air/fuel ratio, and composition sensors may be coupled to various locations in the vehicle system 6. As another example, the actuators may include fuel injector 66, vapor blocking valve 110, purge valve 112, vent valve 114, vent line valve 124, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3 and 5.

Figure 2:
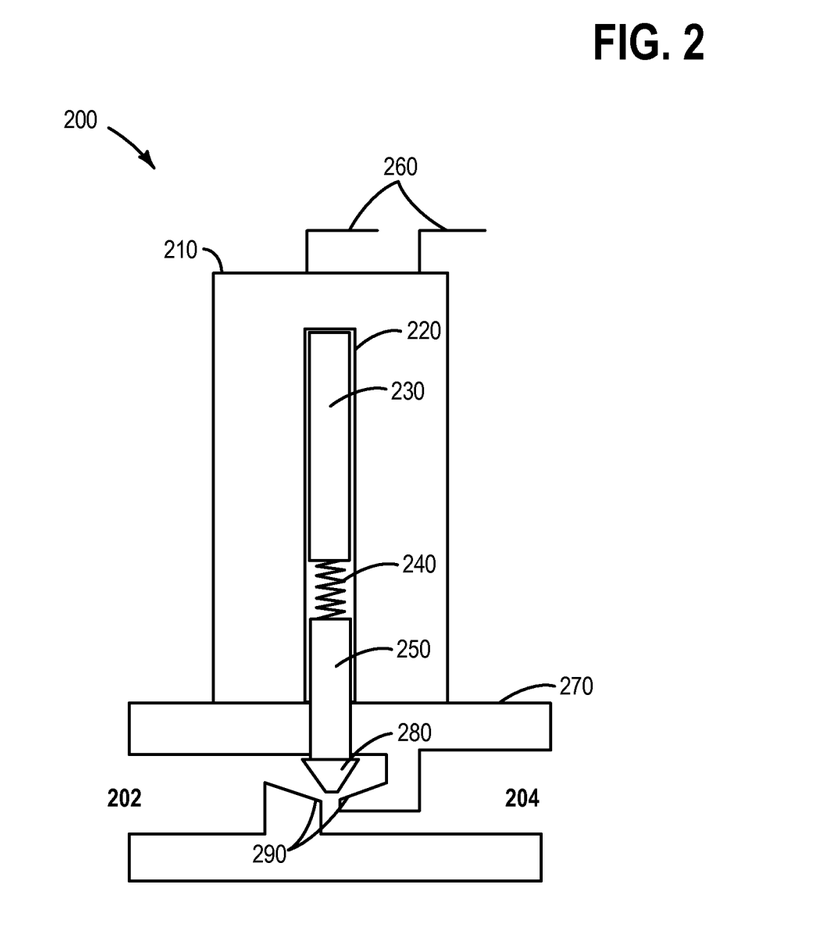
FIG. 2 shows a cross section of a gas solenoid canister purge valve.

Turning now to FIG. 2, it illustrates a cross section of an example canister purge solenoid valve 200. Canister purge solenoid valve 200 comprises a valve body 270, valve seat 290, and a valve stem comprising valve plunger 250 and plunger tip 280. When the plunger tip 280 is seated on the surfaces of the valve seat 290, fluid flow (e.g. fuel vapor flow) through the valve from the inlet 202 to the outlet 204 is prevented. Canister solenoid valve 200 further comprises a shaft 220 containing a plug 230, return spring 240, and a portion of the valve plunger 250. To operate the valve, current is driven via electrical connections 260 to an electromagnet 210, which then causes the plunger 250 to withdraw into the shaft 220, compressing the return spring 240, and allowing fluid to flow through the valve. The canister solenoid valve 200 is normally closed, when there is no current flowing to the electromagnet 210, wherein the return spring may be compressed beyond its relaxed state when the valve is closed. A needle-type solenoid is shown in FIG. 2 however other types of solenoid valves may also be used. The canister vent valve 114 and vent line valve 124 may also be solenoid valves of the type illustrated in FIG. 2 or may be another type of solenoid valve.

Canister purge valve 112 may be a solenoid valve of the same type as canister purge solenoid valve 200. Accordingly, controller 12 may supply current to electrical connections 260 in order to open canister purge valve 112. Canister purge valve 112 may be closed by supplying no current to electrical connections 260. Further, canister purge valve 112 may be configured such that vacuum in fuel system 18, arising for example from intake engine manifold vacuum, aids in closing canister purge valve 112. In other words, negative pressure in the purge line 28 or in the canister 22 may aid in maintaining the valve plunger tip 280 seated on the valve seat 290.

Canister purge valve 112 may also be a variable pulse width modulated (PWM) solenoid valve, wherein the PWM duty cycle and frequency of the valve control signal determine the valve position. PWM valves can exhibit varied closing force depending on the duty cycle prior to closing the valve. For example, if the valve is closed from a partially open position, the seating force may be reduced as compared to when the valve is closed from a fully open position. As a further example, if the valve is closed for a first predetermined time, then fully opened for a second predetermined time, and then closed, a final closing force providing a good valve seat can be achieved.

Figure 3:
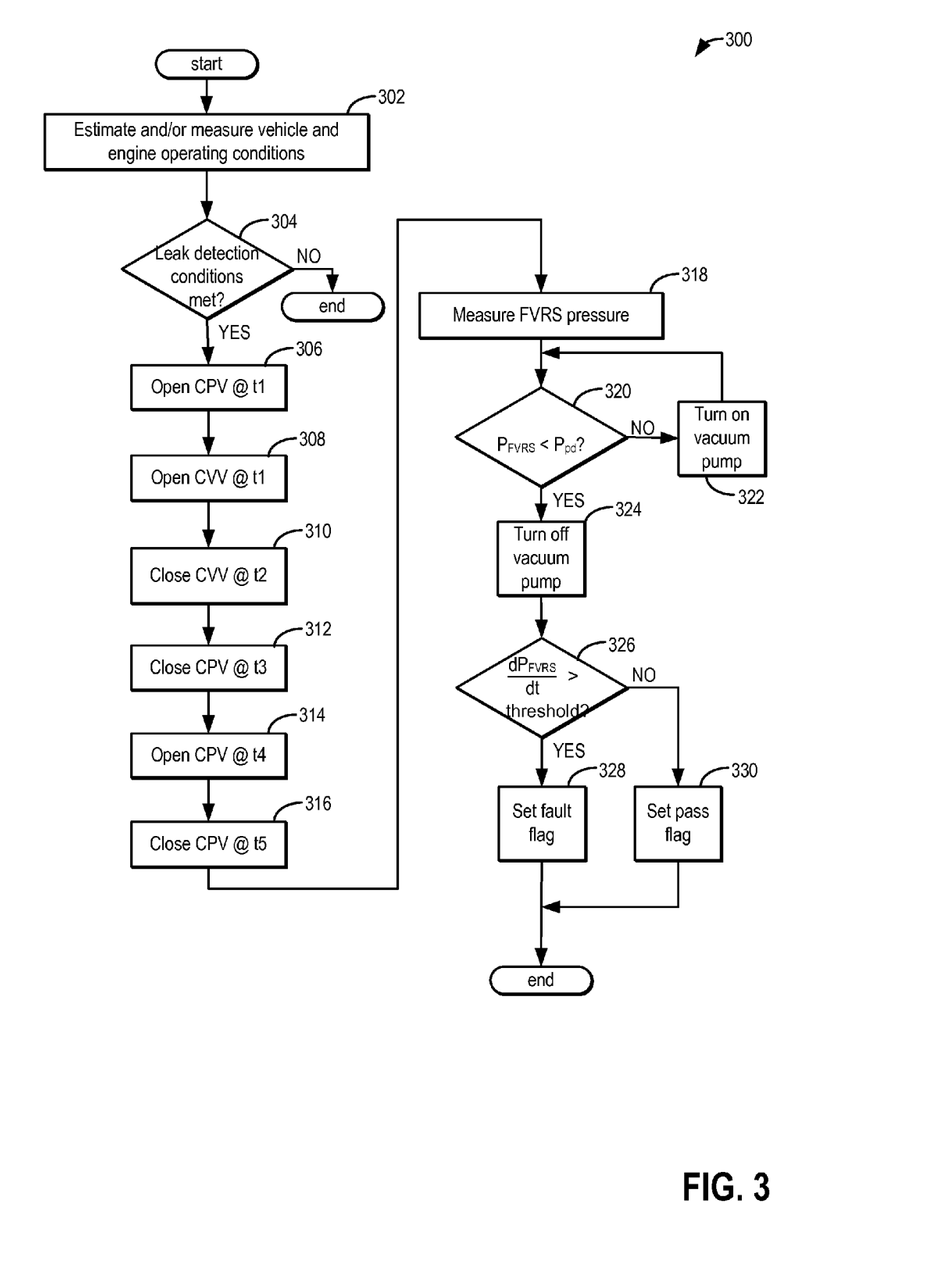
FIG. 3 shows a high level flow chart illustrating a routine for performing a fuel vapor recovery system leak test.

Now turning to FIG. 3, an example routine 300 for conducting a fuel vapor recovery system leak test when the engine is off. The engine may be off when the vehicle is stationary or parked. For the case of a hybrid vehicle, the engine may be switched off when the vehicle is operated in electric mode (e.g., vehicle is powered by a battery).

Routine 300 begins at 302 where vehicle and engine operating conditions such as engine speed, engine temperature, engine load, ambient conditions (e.g., ambient temperature and humidity), barometric pressure, battery state of charge, canister conditions, fuel level etc. are estimated and/or measured. Continuing at 304, routine 300 determines if leak detection conditions are met. The leak detection conditions may be predetermined leak detection conditions. As an example, predetermined leak detection conditions may be met when the engine has just been switched off when the vehicle is stationary and/or parked, or when a hybrid vehicle is switched to battery mode. Leak detection may also be performed periodically or intermittently. For example, predetermined leak detection conditions may also be met after an elapsed time following a prior leak detection test. Furthermore, predetermined leak conditions may be met following a canister purge after the CPV 112 is closed. As a further example, predetermined leak detection conditions may be met when a loss of vacuum or pressure greater than a threshold change is detected in the fuel system. Fuel system pressure or vacuum may be monitored using fuel system pressure sensor 121. As shown in FIG. 1, fuel system pressure sensor 121 is located at fuel tank 20. As another example, fuel system pressure sensor may be located in conduit 31, at canister 22, or in purge line 28. Furthermore, fuel system 18 may comprise multiple fuel system pressure sensors to monitor the pressure in the fuel system at multiple locations simultaneously. If predetermined leak detection conditions are not met, routine 300 ends.

In response to leak conditions being met, routine 300 continues at 306 and 308 where fuel vapor recovery system leak testing is started by opening CPV 112 and CVV 114 respectively. Control system 14 may open CPV 112 and CVV 114 simultaneously, or may open CVV 114 shortly after opening CPV to allow the pressure in the fuel system to equilibrate. Routine 300 continues at 310 where CVV 114 is closed. Thus CVV 114 is opened momentarily in step 308 long enough for the pressure equilibration, and then closed in 310. Next, at 312, CPV 112 is closed. After closing CPV 112 for a first predetermined time, CPV 112 is fully opened at 314 for a second predetermined time, and then CPV 112 closed at 316. The second predetermined time may be shorter than the first predetermined time, and may be just long enough to allow CPV 112 to fully open, wherein the valve bounces off the open stop position, and adds more momentum to the final closing force in 316 to provide a good valve seat.

Routine 300 continues at 318 where the fuel vapor recovery system (FVRS) pressure ($P_{FVRS}$) is measured. $P_{FVRS}$ may be determined using fuel system pressure sensor 121. As described above, fuel system pressure sensor 121 may be located at fuel tank 20, however fuel system pressure sensor 121 may alternately be located in conduit 31, at canister 22, or in purge line 28. Furthermore, fuel system 18 may comprise multiple fuel system pressure sensors to monitor the pressure in the fuel system at multiple locations simultaneously. If $P_{FVRS}$ is less than a predetermined pressure ($P_{pd}$) (e.g., if there is high enough vacuum in the fuel system), then routine 300 continues at 324. If $P_{FVRS}$ is greater than $P_{pd}$, then canister vent vacuum pump 116 may be switched on (and CVV 114 may be opened) at 322 momentarily to reduce $P_{FVRS}$ below $P_{pd}$. As an alternative, vacuum pump 116 may also be coupled to the fuel tank 20 or conduit 31 for lowering the pressure of the fuel system. When vacuum pump 116 is coupled to the fuel tank 20 or conduit 31, vacuum may be applied to fuel system via vacuum pump 116 at 322 without opening CVV 114. After $P_{FVRS}$ is reduced below $P_{pd}$, the vacuum pump is switched off at 324 (and CVV 114 may be closed).

Next, routine 300 continues at 326, where it is determined if the rate of change in $P_{FVRS}$ is greater than a predetermined threshold rate of change. The rate of change in $P_{FVRS}$ may be determined over a predetermined length of time, wherein the predetermined length of time may be long enough to reliably detect a leak in the fuel system due to a change in $P_{FVRS}$. If there is a leak in the fuel vapor recovery system, then $P_{FVRS}$ may change at a rate greater than the threshold rate of change, and routine 300 continues at 328 where a fault flag is set (e.g. a diagnostic trouble code (DTC) may be set). Setting the fault flag or DTC may subsequently cause a malfunction indicator lamp (MIL) to be lit, warning the operator of a possible fuel system leak. If the rate of change in $P_{FVRS}$ is less than the threshold rate of change, a leak is not detected, and routine 300 continues at 330 where a set pass flag is set. Following 328 or 330, routine 300 ends.

In this manner, a method for a vehicle having a carbon canister coupled between a fuel tank and an engine intake manifold via an electronically controlled purge valve may comprise initiating a fuel vapor leak test under predetermined conditions, and in response to said initiation, fully opening said purge valve from a closed position to a fully open position for a predetermined time, and then fully closing said purge valve after said predetermined time and commencing said leak test. The method may further comprise measuring pressure in said carbon canister, wherein said leak test is responsive to a change in said pressure measurement, and actuating a vacuum pump coupled to said carbon canister during said leak test before commencing said pressure measurement. The method may also comprise measuring pressure in said fuel tank, wherein said leak test is responsive to a change in said pressure measurement, and actuating a vacuum pump coupled to said fuel tank during said leak test before commencing said pressure measurement.

In this manner, a method for a vehicle system having a carbon canister coupled between a fuel tank and an engine intake manifold via an electronically controlled purge valve may comprise determining a fuel vapor leak test based on predetermined engine conditions. Before commencing said leak test, the method may comprise opening said purge valve for a preselected time, then closing said purge valve for a first predetermined time, then fully opening said purge valve for a second predetermined time, and then fully closing said purge valve and commencing said leak test. Said second predetermined time may be less than said first predetermined time.

Furthermore, the method for a vehicle system may further comprise measuring pressure in said carbon canister, wherein said leak test is responsive to a change in said pressure measurement, and actuating a vacuum pump coupled to said canister during said leak test before commencing said pressure measurement. Further still, the method for a vehicle system may comprise measuring pressure in said fuel tank, wherein said leak test is responsive to a change in said pressure measurement, and actuating a vacuum pump coupled to said fuel tank during said leak test before commencing said pressure measurement.

Figure 4:
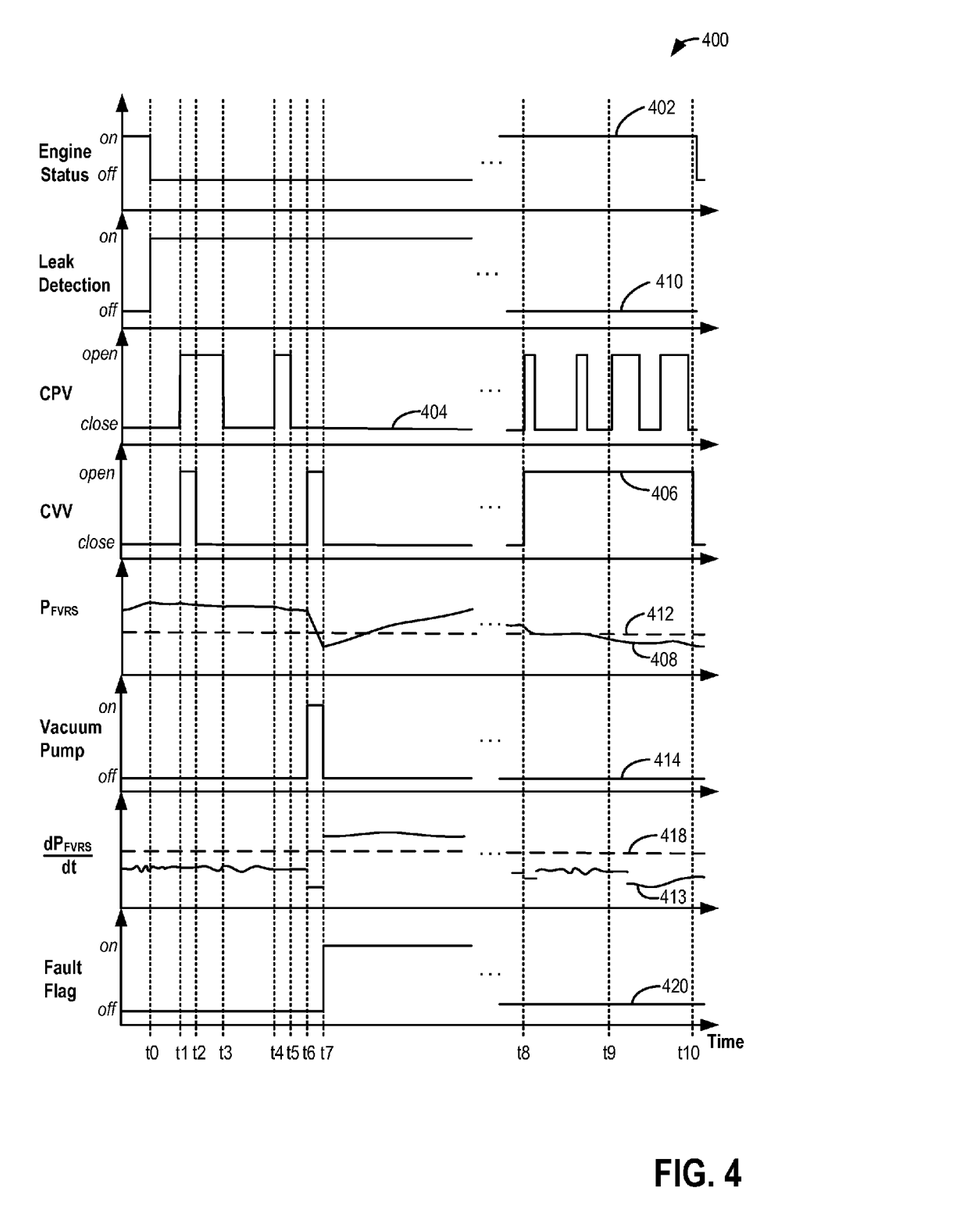
FIG. 4 shows an example timeline.

Turning now to FIG. 4, it illustrates an example timeline 400 for performing a fuel vapor recovery system leak test, and for purging the canister while operating the pulse width modulated canister valve. In particular, timeline 400 shows how the CPV can be controlled to ensure that a good valve seating is obtained for reliably performing a leak test. Timeline 400 depicts changes in engine status 402, leak detection status 410, CPV status 404, CVV status 406, $P_{FVRS}$ 408, vacuum pump status 414, rate of change of $P_{FVRS}$ 413, and fault flag status 420. Prior to t0, a vehicle may be operating with the engine on, leak detection off, CPV and CVV closed, vacuum pump off, and fault flag off. Furthermore, $P_{FVRS}$ may be above a threshold pressure 412 wherein the rate of change of $P_{FVRS}$ is below a threshold rate of change 418. At t0, the vehicle engine is switched off, for example, due to switching to hybrid electric mode wherein the vehicle is powered by a battery. In response to the engine being switched off, a leak detection condition may be met, and the leak detection status may change from off to on thereby beginning a leak detection test of the FVRS. Next, controller 12 may open the CPV 112 and CVV 114 simultaneously at t1, closing CVV 114 at t2 shortly thereafter. Opening CPV 112 and CVV 114 may allow the pressure in the fuel system to equilibrate. After closing CVV 114 at t2, CPV may be closed at t3.

Next, after a first predetermined time (e.g., t4-t3), CPV 112 may be fully opened for a second predetermined time, and then closed at t4. The second predetermined time may be set shorter than the first predetermined time and may be set long enough to cycle CPV fully open and then closed. Both first and second predetermined times may be longer than the valve time constants for closing and fully opening the valve respectively. During the second predetermined time, (e.g., between t4 and t5), the valve stem may bounce off the open stop position thereby adding more momentum to the final closing force when the valve seats. In this manner, closing the CPV for a first predetermined time, followed by fully opening the CPV for a second predetermined time and then closing the CPV may reliably seat and seal the CPV when conducting a leak test.

At t6, because $P_{FVRS}$ is greater than a threshold pressure 412 (e.g., fuel system vacuum is weak), controller 12 may turn on vacuum pump 116 in order to reduce $P_{FVRS}$ below the threshold pressure 412. In the example configuration of FIG. 1, vacuum pump 116 is located at the canister vent 27. Accordingly CVV 114 is also opened at t6 to allow vacuum to be applied to the fuel system. While the vacuum pump is on, $P_{FVRS}$ is lowered, and the rate of change of $P_{FVRS}$ is lowered. At t7, in response to $P_{FVRS}$ being lowered below the threshold pressure 412, the vacuum pump is switched off.

After t7, $P_{FVRS}$ begins to increase at a rate of change greater than the threshold rate of change 418. In response, a fault flag is set, indicating detection of a leak and the test is ended. In some examples, $P_{FVRS}$ and the rate of change of $P_{FVRS}$ may be monitored for a predetermined length of time before evaluating if a leak is present. For instance, the rate of change in $P_{FVRS}$ may be averaged over a period of time to determine if the rate of change in $P_{FVRS}$ is above the threshold rate of change 418.

Continuing with FIG. 4 at some time after t7, the timeline 400 shows an example of operating the canister purge valve (e.g. in a pulse width modulated manner) in order to purge the fuel system canister when the vehicle engine is on. For example, if the canister load is above a threshold load, controller 12 may begin pulsing the canister purge valve to purge the fuel system canister. If the engine intake manifold vacuum is high enough (e.g. low enough pressure), then the fuel vapors from the canister will be purged into the engine intake manifold. A vacuum pump (e.g., vacuum pump 122) may be switched on if the engine intake manifold is low, for example, due to turbocharging. During canister purging, leak detection 410 is off, the canister vacuum pump 116 is off, and fault flag 420 is set off. In order to facilitate canister purging, the canister vent valve 114 is opened and the canister purge valve 112 pulsed at t8. At t9, the controller begins pulsing the canister at a higher duty cycle in order to purge the fuel vapors from the canister at a higher rate. When the canister purge valve is opened during the PWM operation, $P_{FVRS}$ 408 and the rate of change in $P_{FVRS}$ 413 decrease slightly due to the engine intake manifold vacuum.

Figure 5:
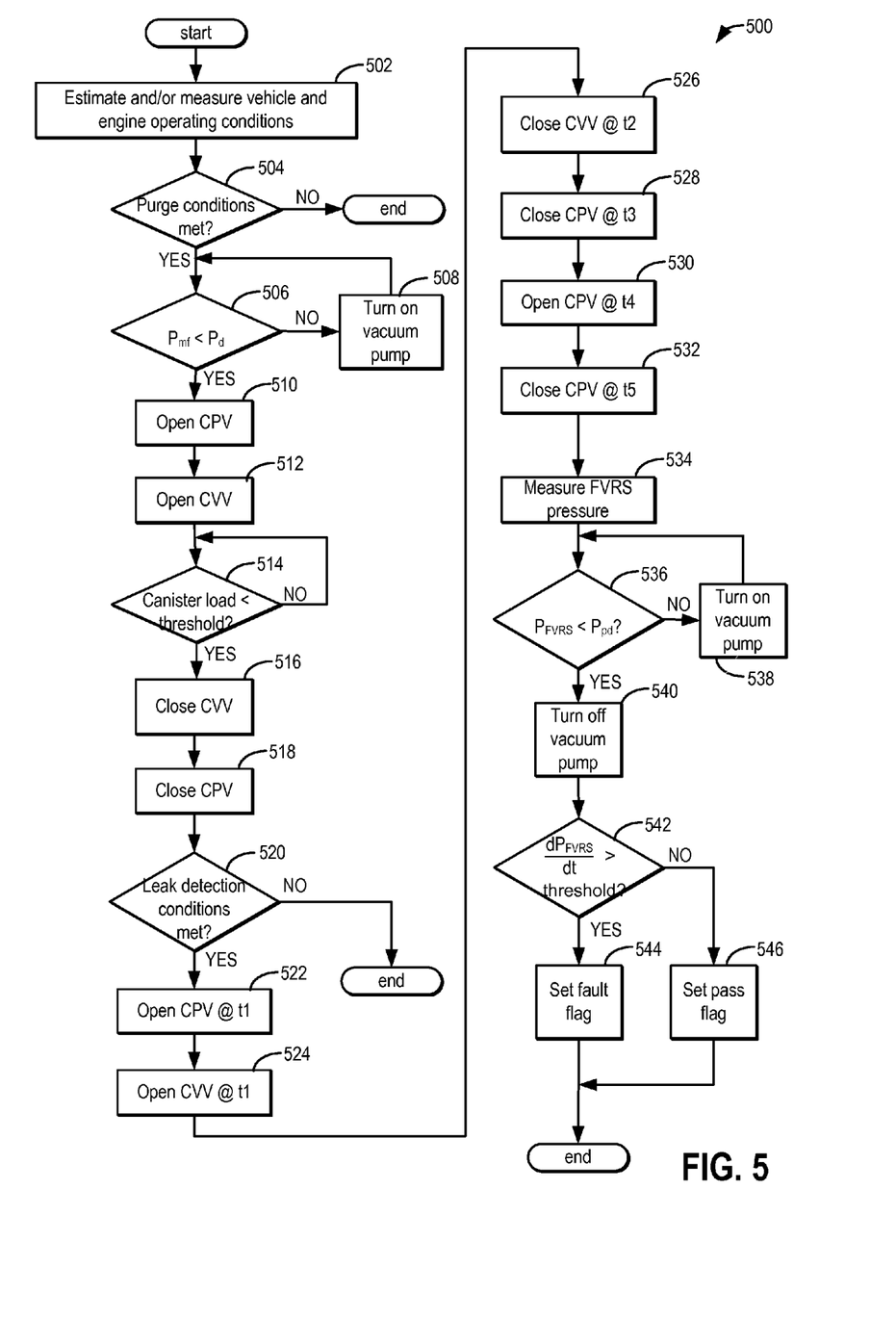
FIG. 5 shows a high level flow chart illustrating a routine for performing a fuel vapor recovery system leak test.

Turning now to FIG. 5, it illustrates an example routine for performing a leak test of the FVRS when the engine is on. Routine 500 begins at 502 where vehicle and engine operating conditions such as engine speed, engine temperature, engine load, ambient conditions (e.g., ambient temperature and humidity), barometric pressure, battery state of charge, canister conditions, fuel level etc. are estimated and/or measured. At 504, it is determined if purge conditions are met. The purge conditions may be preselected engine conditions. In one example, preselected purge conditions may be met when the canister load (estimated or inferred) is higher than a threshold canister load. The canister load may be estimated based on, for example, pressure differences across the canister, an air/fuel ratio measured or estimated downstream from the canister, an engine exhaust air/fuel ratio, and/or based on fuel vapor concentrations learned on an immediately previous canister loading and/or purging operation. If preselected purge conditions are not met, then routine 500 ends.

In response to purge conditions being met, routine 500 continues at 506 where it is determined if the engine intake manifold pressure (Pmf) is less than a predetermined pressure (Pd). If the intake manifold pressure is not lower than Pd, the canister may not be able to be purged, and vacuum pump 122 may be switched on to apply vacuum to the engine intake manifold at 508. In conjunction with the vacuum pump being turned on, vent line valve 124 may also be opened.

In response to the engine intake manifold pressure being less than $P_d$, routine 500 continues at 510 and 512 where the CPV 112 and CVV 114 are opened to purge the canister. After opening the CPV 112 and CVV 114, it is determined if the canister load is reduced below a threshold load. If the canister load is not reduced below the threshold load, routine 500 returns to 514. When the canister load is below a threshold load, the canister purge is ended and routine 500 closes CVV and CPV at 516 and 518 respectively.

Routine 518 then continues at 520 where it determines if leak detection conditions are met. As described above for 304 in routine 300, the leak detection conditions may be predetermined leak detection conditions. As an example, predetermined leak detection conditions may be met when the engine has just been switched off when the vehicle is stationary and/or parked, or when a hybrid vehicle is switched to battery mode. Leak detection may also be performed periodically or intermittently. For example, predetermined leak detection conditions may also be met after an elapsed time following a prior leak detection test. Furthermore, predetermined leak conditions may be met following a canister purge after the CPV 112 is closed. As a further example, predetermined leak detection conditions may be met when a loss of vacuum or pressure greater than a threshold change is detected in the fuel system. If predetermined leak conditions are not met, routine 500 ends.

In response to leak conditions being met, routine 500 continues at 522 and 524 where fuel vapor recovery system leak testing is started by opening CPV 112 and CVV 114 respectively. Control system 14 may open CPV 112 and CVV 114 simultaneously, or may open CVV 114 shortly after opening CPV to allow the pressure in the fuel system to equilibrate. Routine 500 continues at 526 where CVV 114 is closed. CVV 114 is thus opened momentarily in 524 long enough to for the pressure equilibration of the fuel system, and then closed in 526. Next, at 528, CPV 112 is closed. After closing CPV 112 in 528 for a first predetermined time, CPV 112 is fully opened at 530 for a second predetermined time, after which CPV 112 is then closed at 532. The second predetermined time may be shorter than the first predetermined time, and may be just long enough to allow CPV 112 to fully open, wherein the valve bounces off the open stop position, and thereby adds more momentum to the final closing force in 532 to provide a good valve seat.

Routine 500 continues at 534 where the fuel vapor recovery system (FVRS) pressure ($P_{FVRS}$) is measured. $P_{FVRS}$ may be determined using fuel system pressure sensor 121. As described above, fuel system pressure sensor 121 may be located at fuel tank 20, however fuel system pressure sensor 121 may alternately be located in conduit 31, at canister 22, or in purge line 28. Furthermore, fuel system 18 may comprise multiple fuel system pressure sensors to monitor the pressure in the fuel system at multiple locations simultaneously. If $P_{FVRS}$ is less than a predetermined pressure ($P_{pd}$) (e.g., if there is high enough vacuum in the fuel system), then routine 500 continues at 540. If $P_{FVRS}$ is greater than $P_{pd}$, then canister vent vacuum pump 116 may be switched on (and CVV 114 may be opened) at 538 momentarily to reduce $P_{FVRS}$ below $P_{pd}$. As an alternative, vacuum pump 116 may also be located at the fuel tank or conduit 31 for lowering the pressure of the fuel system. At these locations, vacuum may be applied to fuel system via vacuum pump 116 at 538 without opening CVV 114. After $P_{FVRS}$ is reduced below $P_{pd}$, the vacuum pump is switched off at 540 (and CVV 114 may be closed).

Next, routine 500 continues at 542, where it is determined if the rate of change in $P_{FVRS}$ is greater than a predetermined threshold rate of change. The rate of change in $P_{FVRS}$ may be determined over a predetermined length of time, wherein the predetermined length of time may be long enough to reliably detect a leak in the fuel system due to a change in $P_{FVRS}$. If there is a leak in the fuel vapor recovery system, then $P_{FVRS}$ may change at a rate greater than the threshold rate of change, and routine 500 continues at 544 where a fault flag is set (e.g. a diagnostic trouble code (DTC) may be set). Setting the fault flag or DTC may subsequently cause a malfunction indicator lamp (MIL) to be lit, warning the operator of a possible fuel system leak. If the rate of change in $P_{FVRS}$ is less than the threshold rate of change, a leak is not detected, and routine 500 continues at 546 where a set pass flag is set. Following 544 or 546, routine 500 ends.

In this manner, a method for a vehicle system having a carbon canister coupled between a fuel tank and an engine intake manifold via an electronically controlled purge valve may comprise initiating a fuel vapor purge based upon preselected engine conditions by opening said purge valve and inducting fuel vapors from said canister into said engine intake manifold, stopping said fuel vapor purge by closing said purge valve based on a determination that fuel vapors absorbed in said canister are less than a threshold, and initiating a fuel vapor leak test when predetermined conditions are met. In response to said initiation, the method may comprise fully opening said purge valve from a closed position to a fully open position for a predetermined time, and then fully closing said purge valve and commencing said leak test. Furthermore, the method may comprise measuring pressure in said carbon canister or said fuel tank and wherein said leak test is responsive to a change in said pressure measurement.

Before commencing said pressure measurement during said leak test, the method may comprise actuating a vacuum pump coupled to said canister or said fuel tank. Furthermore, said determination that fuel vapors in said canister are less than said threshold is based upon engine exhaust air/fuel ratio. Further still, the method may comprise opening said purge valve for a preselected time before commencing said leak test.

As will be appreciated by one of ordinary skill in the art, routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, non-hybrid vehicles, and vehicles with I3, I4, I5, V6, V8, V10, and V12 engines operating in natural gas, gasoline, diesel, or alternative fuel configurations could use the present description to advantage.

The invention claimed is:

1. A method for a vehicle having a fuel vapor canister coupled between a fuel tank and an engine intake manifold via an electronically controlled purge valve, comprising:
   initiating a vapor leak test under predetermined conditions; and
   in response to said initiation, opening said purge valve from a closed position to an open position for a predetermined time; opening and closing a vent valve coupled to said fuel vapor canister during said predetermined time; closing said purge valve after said predetermined time; fully opening said purge valve for a second predetermined time; and then fully closing said purge valve before commencing said leak test.

2. The method recited in claim 1 further comprising measuring pressure in said fuel vapor canister and wherein said leak test is responsive to a change in said pressure measurement.

3. The method recited in claim 1 further comprising measuring pressure in said fuel tank and wherein said leak test is responsive to a change in said pressure measurement.

4. The method recited in claim 2 further comprising actuating a vacuum pump coupled to said fuel vapor canister during said leak test before commencing said pressure measurement.

5. The method recited in claim 3 further comprising actuating a vacuum pump coupled to said fuel tank during said leak test before commencing said pressure measurement.

6. A method for a vehicle system having a carbon canister coupled between a fuel tank and an engine intake manifold via an electronically controlled purge valve, comprising:
   conducting a fuel vapor leak test based on predetermined engine conditions;
   before commencing said leak test, opening said purge valve for a preselected time; then closing said purge valve for a first predetermined time; then fully opening said purge valve for a second predetermined time; and then fully closing said purge valve and commencing said leak test.

7. The method recited in claim 6 wherein said second predetermined time is less than said first predetermined time.

8. The method recited in claim 6 further comprising opening and closing a vent valve coupled to said canister during said preselected time.

9. The method recited in claim 6 further comprising measuring pressure in said carbon canister and wherein said leak test is responsive to a change in said pressure measurement.

10. The method recited in claim 6 further comprising measuring pressure in said fuel tank and wherein said leak test is responsive to a change in said pressure measurement.

11. The method recited in claim 10 further comprising actuating a vacuum pump coupled to said canister during said leak test before commencing said pressure measurement.

12. A method for a vehicle system having a carbon canister coupled between a fuel tank and an engine intake manifold via an electronically controlled purge valve, comprising:
   initiating a fuel vapor purge based upon preselected engine conditions by opening said purge valve and inducting fuel vapors from said canister into said engine intake manifold;
   stopping said fuel vapor purge by closing said purge valve based on a determination that fuel vapors absorbed in said canister are less than a threshold;
   initiating a fuel vapor leak test when predetermined conditions are met;
   in response to said initiation, fully opening said purge valve from a closed position to a fully open position for a predetermined time; and then fully closing said purge valve; and opening said purge valve for a preselected time before commencing said leak test.

13. The method recited in claim 12 further comprising measuring pressure in said carbon canister or said fuel tank and wherein said leak test is responsive to a change in said pressure measurement.

14. The method recited in claim 13 further comprising actuating a vacuum pump coupled to said canister or said fuel tank during said leak test before commencing said pressure measurement.

15. The method recited in claim 12 wherein said determination that fuel vapors absorbed in said canister are less than said threshold is based upon engine exhaust air/fuel ratio.

16. The method recited in claim 12 wherein fully opening said purge valve from the closed position to the fully open position for said predetermined time is less than said purge valve opening for said preselected time.

* * * * *